J. A. FRANKLIN.
VEHICLE WHEEL.
APPLICATION FILED APR. 21, 1919.
1,322,685.
Patented Nov. 25, 1919.
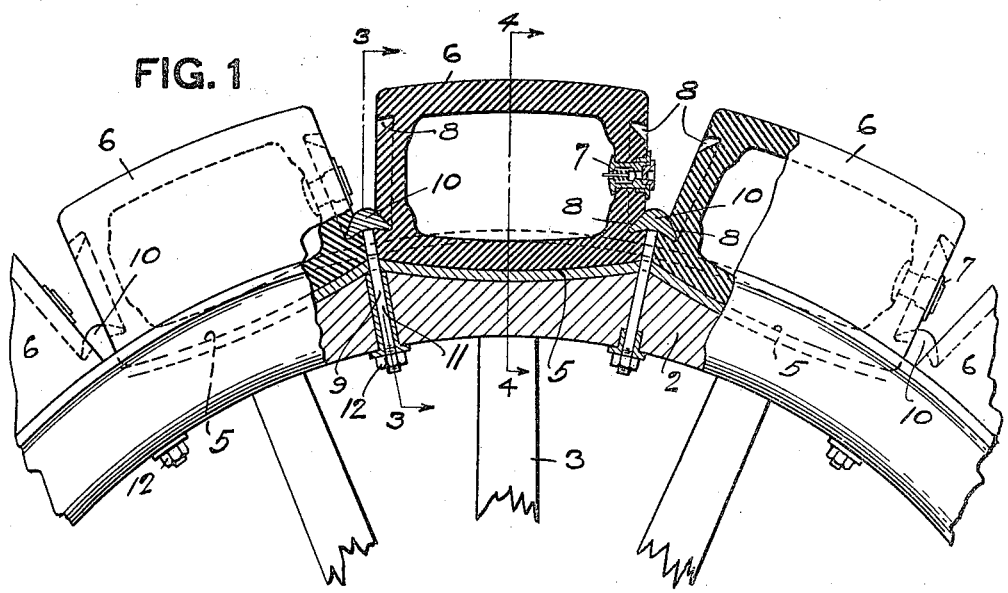
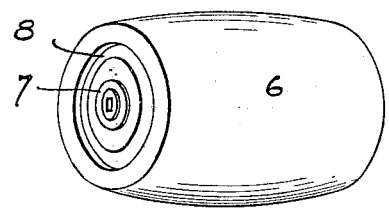
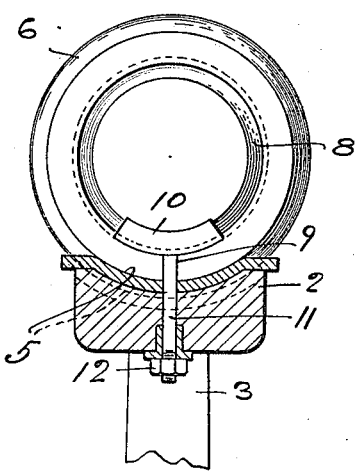
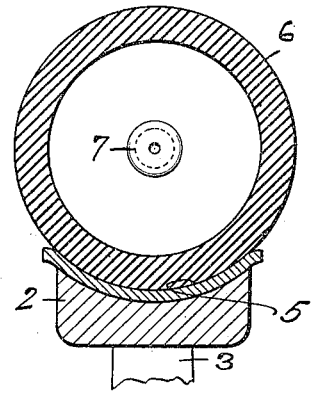
INVENTOR

UNITED STATES PATENT OFFICE.

JOHN ARMFIELD FRANKLIN, OF PITTSBURGH, PENNSYLVANIA.

VEHICLE-WHEEL.

1,322,685.

Specification of Letters Patent. Patented Nov. 25, 1919.

Application filed April 21, 1919. Serial No. 291,421.

*To all whom it may concern:*

Be it known that I, JOHN A. FRANKLIN, a citizen of the United States, and resident of Pittsburgh, in the county of Allegheny and State of Pennsylvania, have invented a new and useful Improvement in Vehicle-Wheels; and I do hereby declare the following to be a full, clear, and exact description thereof.

My invention relates to vehicle wheels and has reference more particularly to wheels in which rubber tires are employed to give resiliency and ease in riding.

The object of my invention is to provide a wheel of this character in which the tire is so constructed that the tire can be shifted, so that when a part becomes worn the worn portion may be shifted around where it does not have bearing contact with the road in running, and an unworn portion is brought around in position for contact with the road, whereby the life of the tire is greatly lengthened, and the cost of repairs due to punctures and replacement by new tires is greatly reduced.

To these ends my invention comprises the novel features hereinafter set forth and claimed.

In the accompanying drawing, Figure 1 is a face view of a portion of a wheel partly in section; Fig. 2 is a perspective view of one of the tire sections; Fig. 3 is an enlarged cross-section taken on the line 3—3 Fig. 1; and Fig. 4 is a cross-section on line 4—4 Fig. 1.

In the accompanying drawing the numeral 2 designates the rim of my improved wheel, and 3 the spokes. The rim is provided with the concave seats 5 within which fit the units 6 composing the tire. These units as illustrated are substantially cylindrical shaped in form, so as to conform to and fit within the seats or pockets 5 of the rim. Each unit in itself forms a pneumatic member and has a suitable connection 7 for the attachment of a pump to inflate said unit.

The ends of each unit are provided with the annular grooves 8, and in order to secure the units to the rim I employ bolts 9 with heads 10 triangular shaped in cross-section, so that one bolt has its head fitting into the annular groove 8 of adjoining sections, and the shank 11 of the bolt passes down through the rim and is secured in place by the nut 12.

In this manner the units are securely held in position on the rim with only a slight space between each unit toward the outer portion so that I obtain a practically continuous tire. In fact, when the tire is in use the weight bearing on the units which are in contact with the road will tend to force the units together so that there will be practically no separation at the point of juncture of the units.

While I have described my invention with reference to pnuematic units, it is apparent that solid rubber units could be employed and furthermore, any suitable means of securing the units to the rim could be substituted for that shown, and other changes made without affecting the scope of my invention.

It will be apparent that in case any of the units become worn at any point, due to the wearing away of the rubber, the unit may be shifted so as to bring a new and unworn surface of the rubber into bearing contact with the roadway by simply loosening the bolts and turning the unit or units to bring a new surface into position for road contact. By examining the units from time to time punctures may be obviated by shifting the position of the units before they have worn to a point where they are in danger of breaking.

By my invention, I provide a wheel which will greatly outlast the ordinary wheel provided with a pneumatic tire in one piece, where if a puncture takes place it is necessary to remove the whole tire, and no provision is made for shifting the tire to relieve the worn parts and substitute an unworn surface for road contact.

What I claim is:

1. In a vehicle wheel, the combination of a rim having concave seats formed therein, substantially cylindrical units formed of resilient material conforming in cross-section to the shape of said seats whereby by shifting said units laterally a new bearing face may be brought into position, and means for securing said units in position on said rim.

2. In a vehicle wheel, the combination of a rim having concave seats, substantially cylindrical units of resilient material fitting in said seats, said units having annular grooves formed in the ends thereof, and bolts having heads fitting into the grooves of adjoining units and passing through the rim, and means for securing said bolts in place.

In testimony whereof, I the said JOHN A. FRANKLIN, have hereunto set my hand.

JOHN ARMFIELD FRANKLIN.

Witnesses:
GEORGE P. ANDREWS,
HENRY ZENGSCHMIDT.